(12) United States Patent
Hattori

(10) Patent No.: US 11,396,597 B2
(45) Date of Patent: Jul. 26, 2022

(54) EPOXY RESIN COMPOSITION AND CURED OBJECT OBTAINED THEREFROM

(71) Applicant: NIPPON STEEL CHEMICAL & MATERIAL CO., LTD., Tokyo (JP)

(72) Inventor: Koichi Hattori, Tokyo (JP)

(73) Assignee: NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 0 days.

(21) Appl. No.: 16/761,061

(22) PCT Filed: Oct. 24, 2018

(86) PCT No.: PCT/JP2018/039416
§ 371 (c)(1),
(2) Date: May 1, 2020

(87) PCT Pub. No.: WO2019/087877
PCT Pub. Date: May 9, 2019

(65) Prior Publication Data
US 2021/0179841 A1 Jun. 17, 2021

(30) Foreign Application Priority Data
Nov. 2, 2017 (JP) .............................. JP2017-213005

(51) Int. Cl.
*C08L 63/04* (2006.01)
*C08F 20/14* (2006.01)
(Continued)

(52) U.S. Cl.
CPC .............. *C08L 63/04* (2013.01); *C08F 20/14* (2013.01); *C08F 220/1804* (2020.02);
(Continued)

(58) Field of Classification Search
None
See application file for complete search history.

(56) References Cited

U.S. PATENT DOCUMENTS

| 2004/0034124 A1 | 2/2004 | Court et al. |
| 2007/0100071 A1 | 5/2007 | Bonnet et al. |

(Continued)

FOREIGN PATENT DOCUMENTS

| JP | 2002-308965 A | 10/2002 |
| JP | 2003-535181 A | 11/2003 |

(Continued)

OTHER PUBLICATIONS

International Search Report dated Jan. 15, 2019, issued for PCT/JP2018/039416.

*Primary Examiner* — Randy P Gulakowski
*Assistant Examiner* — Ha S Nguyen
(74) *Attorney, Agent, or Firm* — Locke Lord LLP; James E. Armstrong, IV; Nicholas J. DiCeglie, Jr.

(57) ABSTRACT

Provided are an epoxy resin composition and a film or a molding material. The epoxy resin composition is an epoxy resin composition including the following components A to D: component A: an epoxy resin having an oxazolidone ring structure in a molecule thereof; component B: an epoxy resin that is liquid at 30° C.; component C: a diblock copolymer having a B-M structure (where M represents a block formed of a homopolymer of methyl methacrylate or a copolymer containing at least 50 wt % of methyl methacrylate, B represents a block that is incompatible with the epoxy resins and the block M, and that has a glass transition temperature Tg of 20° C. or less, and respective blocks represented by B and M are directly bonded to each other or are linked to each other through a linking group); and component D: an amine-based curing agent that is dicyandiamide or a derivative thereof.

6 Claims, 3 Drawing Sheets

(51) Int. Cl.

| | |
|---|---|
| *C08F 220/18* | (2006.01) |
| *C08F 236/06* | (2006.01) |
| *C08G 59/22* | (2006.01) |
| *C08G 59/24* | (2006.01) |
| *C08G 59/26* | (2006.01) |
| *C08G 59/40* | (2006.01) |
| *C08L 53/00* | (2006.01) |
| *C08G 59/32* | (2006.01) |
| *C08G 59/38* | (2006.01) |
| *C09J 163/00* | (2006.01) |
| *C08L 63/00* | (2006.01) |

(52) U.S. Cl.
CPC ...... *C08F 220/1808* (2020.02); *C08F 236/06* (2013.01); *C08G 59/226* (2013.01); *C08G 59/245* (2013.01); *C08G 59/26* (2013.01); *C08G 59/4021* (2013.01); *C08L 53/00* (2013.01); *C08G 2170/00* (2013.01); *C08L 2201/08* (2013.01); *C08L 2203/16* (2013.01); *C08L 2203/30* (2013.01); *C08L 2205/03* (2013.01)

(56) References Cited

U.S. PATENT DOCUMENTS

| | | |
|---|---|---|
| 2008/0051511 A1 | 2/2008 | Guerret et al. |
| 2008/0188626 A1 | 8/2008 | Verghese et al. |
| 2010/0273958 A1 | 10/2010 | Schmidt et al. |
| 2011/0184091 A1* | 7/2011 | Mizuki .............. C08G 59/4238 523/428 |
| 2014/0037939 A1 | 2/2014 | Misumi et al. |
| 2015/0175760 A1 | 6/2015 | Ishimoto et al. |
| 2017/0369700 A1 | 12/2017 | Mitobe et al. |
| 2019/0144660 A1 | 5/2019 | Takeuchi et al. |
| 2019/0330464 A1 | 10/2019 | Ushiyama et al. |

FOREIGN PATENT DOCUMENTS

| | | | |
|---|---|---|---|
| JP | 2004-352024 A | | 12/2004 |
| JP | 2007-514872 A | | 6/2007 |
| JP | 2008-007682 A | | 1/2008 |
| JP | 2008-519889 A | | 6/2008 |
| JP | 2008-528718 A | | 7/2008 |
| JP | 2010-100834 A | | 5/2010 |
| JP | 2011-506679 A | | 3/2011 |
| JP | 2011-183471 A | | 9/2011 |
| JP | 2015-168714 A | | 9/2015 |
| JP | 2015-189959 A | | 11/2015 |
| JP | 2016-219640 A | | 12/2016 |
| JP | 2017101227 A | * | 6/2017 |
| WO | 2012/147401 A1 | | 11/2012 |
| WO | 2014/030638 A1 | | 2/2014 |
| WO | 2014/058042 A1 | | 4/2014 |
| WO | 2016/104314 A1 | | 6/2016 |
| WO | 2016/132655 A1 | | 8/2016 |
| WO | 2017/195304 A1 | | 11/2017 |
| WO | 2018/117214 A1 | | 6/2018 |

* cited by examiner

EPOXY RESIN COMPOSITION AND CURED OBJECT OBTAINED THEREFROM

TECHNICAL FIELD

The present invention relates to an epoxy resin composition to be suitably used in, for example, a pressure-sensitive adhesive or adhesive, or a molding material to be suitably used in a damping steel plate required to have a silence property, and in sports and leisure applications, and general industrial applications, and to a film and a molding material each using the composition.

BACKGROUND ART

A thin plate made of iron, aluminum, or the like has heretofore been used in some of the parts of an automobile or a household electric appliance from the viewpoints of a strength and heat resistance, and hence the vibration sound of the thin plate has occurred at the time of the driving of the automobile or at the time of the operation of the household electric appliance. Accordingly, to prevent the occurrence of the vibration sound, it has been known that, for example, a damping sheet including a resin layer (viscoelastic body) is bonded to the thin plate to improve the damping property of the thin plate.

In addition, the temperature of a thin plate to be arranged near the engine room of the automobile or the motor of the household electric appliance is liable to be high, and hence a damping sheet (damping material) that can express a damping effect even under high temperature has been desired. As a constituent material for such sheet, a fiber-reinforced resin (FRP) obtained by compositing a resin with fibers, such as glass fibers or carbon fibers, to improve its strength has recently been expected as a material replacing a metal because the resin has a high strength as in the metal and can achieve a weight reduction.

Under such circumstances, a technology involving arranging a damping layer, such as a rubber layer or an elastomer layer, between FRP layers each containing a fiber filler, such as carbon fibers or glass fibers, to improve a damping property has been proposed (Patent Literatures 1 and 2), though the technology is not a technology relating to a part for an automobile. However, even when such technology is applied as it is to a part for an automobile, such as a suspension arm, a desired strength is not obtained, and hence the alleviation of such drawback has been required. In addition, it has similarly been proposed that the tan δ of a FRP be improved by incorporating epoxy particles or low-elasticity rubber particles into a space between FRP layers, but a tan δ value that is satisfactory from the viewpoint of a damping property has not been obtained (Patent Literatures 3 and 5). In addition, a molded body obtained by laminating a damping layer made of a synthetic resin between a FRP layer and another FRP layer has been proposed, but a satisfactory attenuation coefficient has still not been obtained, and a problem in terms of heat resistance considered to be required in an automobile application may remain (Patent Literature 4).

Moreover, there has been substantially no idea that a damping property is satisfied by using a metal-made or FRP-made part itself.

CITATION LIST

Patent Literature

[PTL 1] JP 2011-183471 A
[PTL 2] JP 2004-352024 A
[PTL 3] WO 2012/147401 A1
[PTL 4] WO 2016/132655 A1
[PTL 5] WO 2016/104314 A1

SUMMARY OF INVENTION

The present invention has been made in view of such circumstances, and an object of the present invention is to provide an epoxy resin composition that has high heat resistance and a high mechanical strength, and that is excellent in damping property, and a molding material using the composition.

To achieve the object, the inventors of the present invention have made extensive investigations, and as a result, have found that the foregoing problems can be solved by using a specific resin composition. Thus, the inventors have completed the present invention. That is, the present invention is formed of the following construction.

According to one aspect of the present invention, there is provided an epoxy resin composition, including the following components A to D: component A: an epoxy resin having an oxazolidone ring structure in a molecule thereof; component B: an epoxy resin that is liquid at 30° C.; component C: a diblock copolymer having a B-M structure, where M represents a block formed of a homopolymer of methyl methacrylate or a copolymer containing at least 50 wt % of methyl methacrylate, B represents a block that is incompatible with the epoxy resins and the block M, and that has a glass transition temperature Tg of 20° C. or less, and respective blocks represented by B and M are directly bonded to each other or are linked to each other through a linking group; and component D: an amine-based curing agent that is dicyandiamide or a derivative thereof, wherein blending ratios of the respective components satisfy the following equations: A/(A+B)=0.05 to 0.25; C/(A+B)=0.12 to 0.19; and D/(A+B)=1 to 10, where A to D represent contents (masses) of the components A to D, respectively.

The block M of the component C is preferably a structural unit formed of a homopolymer of methyl methacrylate, and the block B thereof is preferably a structural unit selected from 1,4-polybutadiene, polybutyl acrylate, and poly(2-ethylhexyl acrylate).

According to another aspect of the present invention, there is provided a cured product of the epoxy resin composition, the cured product having a tan δ of 0.033 or more in a temperature region of from 0° C. to 10° C., and having a Tg of 120° C. or more and 160° C. or less.

According to the present invention, the molded body excellent in damping property and attenuation property at the time of its curing can be obtained, and the same effect can be obtained in, for example, an adhesive or a molding material using the molded body. That is, according to the resin composition of the present invention, the acrylic block copolymer having a high damping property is suitably incorporated into the epoxy resin composition, and hence the composition has a high tan δ in a wide temperature region while having high heat resistance. Accordingly, the composition is excellent in damping property and attenuation property, and hence can be preferably used in applications such as a household electric appliance and a part for an automobile.

DESCRIPTION OF EMBODIMENTS

Figure 1:
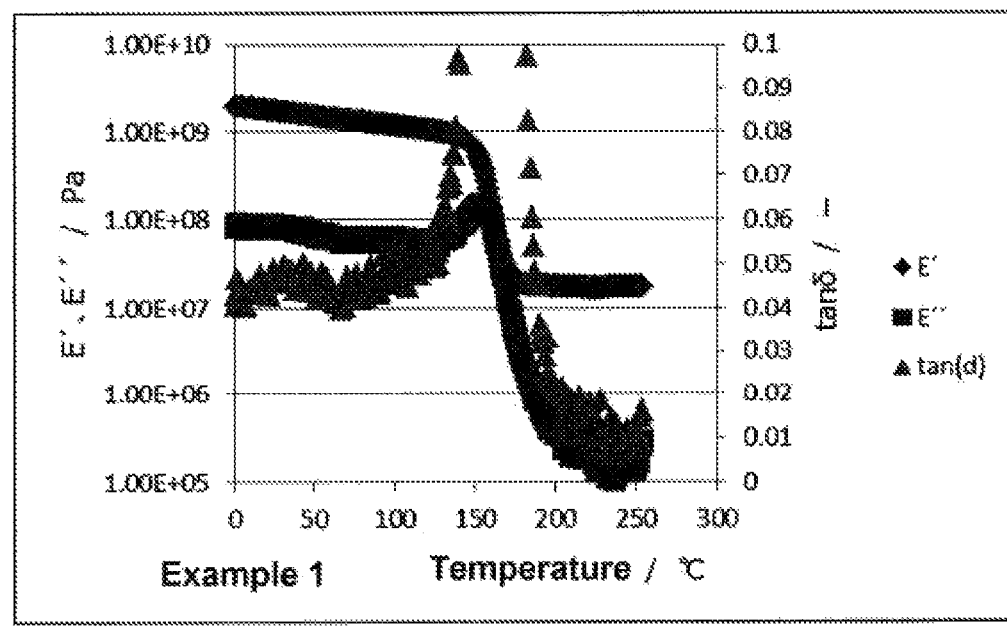
FIG. 1 is a DMA chart of a cured product of Example 1.

An epoxy resin composition of the present invention is an epoxy resin composition including the following components (A) to (D): a component (A) is an epoxy resin having an oxazolidone ring structure in a molecule thereof; a component (B) is an epoxy resin that is liquid at 30° C.; a component (C) is a block copolymer formed of a B-M structure; and a component (D) is an amine-based curing agent that is dicyandiamide or a derivative thereof. The components are hereinafter sometimes simply referred to as "component (A)", "component (B)", "component (C)", and "component (D)". The same holds true for a component (E) and other components. The "epoxy resin composition" of the present invention refers to a resin composition before its curing.

The respective components are described below.

The epoxy resin having an oxazolidone ring structure in a molecule thereof, the epoxy resin serving as the component (A), improves the workability of a prepreg containing an epoxy resin composition including the resin at normal temperature, and improves the heat resistance of a cured product of the epoxy resin composition. The term "normal temperature" as used herein means the temperature range of from 10° C. to 30° C.

The component (A) is preferably an epoxy resin having an oxazolidone ring structure in a molecule thereof, the resin being obtained by causing an isocyanate compound (Y) and an epoxy resin (X) to react with each other.

An oxazolidone ring structure is produced by an addition reaction between an isocyanate group and an epoxy group. That is, the epoxy resin having an oxazolidone ring structure in a molecule thereof (component (A)) may be obtained by causing an excess amount of the epoxy resin (X) to react with the isocyanate compound (Y). In the present invention, although various isocyanate compounds may each be used as a raw material, an isocyanate compound having a plurality of isocyanate groups is preferred for incorporating an oxazolidone ring structure into the skeleton of the epoxy resin. In addition, in order that the cured product of the epoxy resin composition including the component (A) may have high heat resistance, a diisocyanate having a rigid structure is preferred.

Examples of such isocyanate compound (Y) include diisocyanates, such as phenylene diisocyanate, toluylene diisocyanate, bis(isocyanatomethyl)benzene, diphenylmethane diisocyanate, bis(isocyanatomethyl)cyclohexane, and hexamethylene diisocyanate. Of those, phenylene diisocyanate, toluylene diisocyanate, bis(isocyanatomethyl)benzene, and diphenylmethane diisocyanate, each of which has a rigid structure by virtue of the presence of a benzene ring in its skeleton, are preferred. Of those, toluylene diisocyanate is particularly preferred because of being economically easily available.

In addition, with regard to the epoxy resin (X), although various epoxy resins may each be used as a raw material for the epoxy resin having an oxazolidone ring structure, an epoxy resin having epoxy groups at both terminals of a molecule thereof is preferred for efficiently incorporating an oxazolidone ring structure into the skeleton of the epoxy resin. Preferred examples thereof include epoxy resins, such as a bisphenol A-type epoxy resin, a bisphenol F-type epoxy resin, and a biphenyl-type epoxy resin. Of those, bisphenol A diglycidyl ether, bisphenol F diglycidyl ether, and biphenyl diglycidyl ether are particularly preferred for preventing the viscosity of the resultant epoxy resin having an oxazolidone ring structure, that is, the component (A) from becoming excessively high.

The epoxy resin having an oxazolidone ring structure preferably has a softening point of from 60° C. to 100° C. and an epoxy equivalent of from 300 to 400 from the viewpoints of, for example, its productivity, heat resistance, and compatibility.

An addition reaction product, which is obtained by mixing one molecule of toluylene diisocyanate serving as the isocyanate compound (Y) and two molecules of bisphenol A diglycidyl ether serving as the epoxy resin (X) out of such combinations and causing the molecules to react with each other, is particularly preferred for improving the workability of the prepreg at normal temperature and the heat resistance of the cured product of the epoxy resin composition.

The epoxy resin having an oxazolidone ring structure (component (A)) that is available as a commercial product is, for example, YD-952 (product name, manufactured by Nippon Steel & Sumikin Chemical Co., Ltd.), ACR1348 (product name, manufactured by Adeka Corporation), or DER 852 (product name, manufactured by Dow Inc.), and each of the products is preferably used in the present invention. However, YD-952 is particularly preferred.

Two or more kinds of such epoxy resins as described above may be used in combination as the component (A).

The content of the component (A) is preferably from 5 parts by mass to 25 parts by mass with respect to 100 parts by mass of the total amount of all the epoxy resins in the epoxy resin composition of the present invention. Herein, all the epoxy resins include the components (A) and (B). A case in which the amount of the component (A) is 5 parts by mass or more is preferred because the heat resistance and mechanical properties of the cured product of the epoxy resin composition including the component (A) are improved, and from the viewpoint of its compatibility with the component (C). Meanwhile, the content is preferably 25 parts by mass or less for easily obtaining a molded article that has high fracture toughness and is free of any void. The content of the component (A) is more preferably from 7 parts by mass to 22 parts by mass, particularly preferably from 10 parts by mass to 20 parts by mass.

The epoxy resin composition of the present invention further includes the component (B) for adjusting the viscosity of the component (A). Although the component (A) may also be liquid depending on its molecular weight and the like, the component (B) is never the component (A). The viscosity of the component (B) at 30° C. is preferably 1,000 Pa·s or less. The viscosity of the component (B) at 30° C. is obtained by increasing the temperature of the component (B) at a frequency of 1 Hz and 2° C./min, and measuring the viscosity thereof at 30° C. with a rheometer (rotary dynamic viscoelasticity-measuring apparatus), such as DSR-200 (Rheometrics, Inc.).

Although the molecular weight of the component (B) varies depending on the structure of the component (B), in the case of, for example, a bisphenol-type bifunctional epoxy resin, its molecular weight is preferably 200 or more and less than 600, more preferably 500 or less.

Examples of such epoxy resin include a bisphenol A-type epoxy resin, a bisphenol F-type epoxy resin, a biphenyl-type epoxy resin, a dicyclopentadiene-type epoxy resin, a phenol novolac-type epoxy resin, a cresol novolac-type epoxy resin, a tetraglycidyl diamine-type epoxy resin, and a glycidyl phenyl ether-type epoxy resin. Further, examples thereof also include epoxy resins obtained by modifying those epoxy resins with, for example, a rubber or urethane, and brominated epoxy resins obtained by brominating those epoxy resins. However, examples of the epoxy resin are not limited thereto. In addition, two or more kinds of those epoxy resins may be used in combination.

The component (B) is particularly preferably a bisphenol-type bifunctional epoxy resin because of the following reasons: the cured product of the epoxy resin composition has high heat resistance; the epoxy resin composition does not show any abrupt increase in viscosity even when warmed at the time of its molding to reach its curing temperature; and the occurrence of a void in a molded article to be obtained is suppressed.

Although the content of the component (B) only needs to be defined so that the content of the component (A) may fall within the range described in the foregoing, the content is preferably 75 parts by mass or more and 95 parts by mass or less with respect to 100 parts by mass of the total amount of all the epoxy resins in the epoxy resin composition.

The epoxy resin composition of the present invention may include an epoxy resin (Z) except the component (A) and the component (B) to the extent that the effects of the present invention are not impaired.

Such epoxy resin is an epoxy resin that is free of any oxazolidone ring structure in a molecule thereof and is solid at 30° C. For example, as a bifunctional epoxy resin, there are given solid resins, such as a bisphenol A-type epoxy resin, a bisphenol F-type epoxy resin, a biphenyl-type epoxy resin, a dicyclopentadiene-type epoxy resin, and epoxy resins obtained by modifying these epoxy resins. As a polyfunctional epoxy resin that is trifunctional or more, there are given, for example, a phenol novolac-type epoxy resin, a cresol novolac-type epoxy resin, a glycidylamine-type epoxy resin, such as tetraglycidyldiaminodiphenyl-methane, a glycidyl phenyl ether-type epoxy resin, such as tetrakis(glycidyloxyphenyl)ethane or tris(glycidyloxyphenyl)methane, and an epoxy resin of a glycidylamine type and of a glycidyl phenyl ether type, such as triglycidylaminophenol. Further, there are given, for example, epoxy resins obtained by modifying those epoxy resins, and brominated epoxy resins obtained by brominating those epoxy resins. However, examples of the epoxy resin are not limited thereto as long as the epoxy resin is solid at 30° C.

In addition, two or more kinds of those epoxy resins may be used in combination as the other epoxy resin (Z).

The component (C), that is, the block copolymer formed of the B-M structure (hereinafter sometimes abbreviated as "diblock copolymer") is a component essential for improving the toughness and damping property of the epoxy resin composition while maintaining excellent heat resistance thereof.

Here, the respective blocks represented by B and M are directly linked to each other or are linked to each other through an intermediate molecule.

In the diblock copolymer to be used as the component (C), the block M is a block formed of a homopolymer of polymethyl methacrylate or a copolymer containing at least 50 mass % of methyl methacrylate. In addition, the block B is a block that is incompatible with the block M and that has a glass transition temperature Tg (hereinafter sometimes simply referred to as "Tg") of 20° C. or less.

A specific example of the component (C) is a diblock copolymer of poly(methyl methacrylate) and poly(butyl acrylate).

When a polymer incompatible with the epoxy resins is selected as the soft block (block B), a polymer easily compatible with the epoxy resins is selected as the hard block (block M), and the blocks are combined with the component (A), the diblock copolymer is suitably microdispersed in the epoxy resins. When the diblock copolymer having the structure is microdispersed in the epoxy resins, the tan δ of the cured product of the epoxy resin composition can be improved while reductions in mechanical properties thereof are suppressed.

The diblock copolymer of the poly(methyl methacrylate) and the poly(butyl acrylate) having a hard block that is a polymer easily compatible with the epoxy resins is more preferred because the copolymer is satisfactorily dispersed in the epoxy resins and can suppress reductions in mechanical properties of the cured product of the epoxy resin composition. As a commercially available product of the diblock copolymer of the poly(methyl methacrylate) and the poly(butyl acrylate), there is given, for example, Nanostrength D51N manufactured by ARKEMA.

The content of the component (C) is preferably 12 parts by mass or more with respect to 100 parts by mass of the total of all the epoxy resins in the epoxy resin composition because the tan δ of the cured product of the epoxy resin composition at 0° C. or more is high, and the content is preferably 19 parts by mass or less because the bending strength of the cured product of the epoxy resin composition is high. The content is particularly preferably from 13 parts by mass to 17 parts by mass.

When the cured product of the epoxy resin composition of the present invention has such composition as described above, an acrylic copolymer undergoes a phase separation in the epoxy resins while having a sea-island structure, and the sea-island structure is present in a critical state in which the separated phases are linked to each other. Probably because of the foregoing, a peak is not clearly separated into a tan δ resulting from the epoxy resins and a tan δ resulting from an acrylic component, and hence the tan δ resulting from the acrylic component broadens to make it possible to obtain a high tan δ in a wide temperature region of 0° C. or more.

The component (D) is used as a curing agent. As the curing agent serving as the component (D), an amine-based curing agent that is dicyandiamide or a dicyandiamide derivative may be used.

Of those, dicyandiamide or a dicyandiamide derivative is preferably used because of the following reasons: the performance of the epoxy resin composition is not changed by moisture in air, and hence the quality of the epoxy resin composition can be stably maintained for a long time period; and the curing thereof can be completed at relatively low temperature. Herein, the term "relatively low temperature" means a temperature of from about 100° C. to about 130° C.

Although the content of the component (D) varies depending on its kind, in the case of, for example, dicyandiamide, its content is typically from 1 part by mass to 25 parts by mass with respect to 100 parts by mass of the epoxy resins (A+B) or (A+B+Z) to be incorporated into the epoxy resin composition.

The content is more preferably such an amount that the ratio of the number of moles of the active hydrogen of dicyandiamide to the total number of moles of the epoxy groups of the epoxy resins to be incorporated into the epoxy resin composition is from 0.6 to 1.0. When the ratio is set to 0.6 or more, a cured product having satisfactory heat resistance and satisfactory mechanical properties (i.e., a high strength) is obtained. In addition, when the ratio is set to 1.0 or less, a cured product having satisfactory mechanical properties is obtained. The ratio is more preferably from 0.6 to 0.8.

The total number of moles of the epoxy groups of the epoxy resins in the epoxy resin composition only needs to be calculated from their loading amounts.

The epoxy resin composition of the present invention may include the component (E) as a curing accelerator. Examples of the curing accelerator include: a urea compound; tertiary amines and salts thereof; an imidazole and salts thereof; and Lewis acids or Bronsted acids and salts thereof. Of those, a urea compound is suitably used because of its balance between storage stability and an accelerating ability.

As the urea compound, for example, N,N-dimethyl-N'-(3,4-dichlorophenyl) urea, toluene bis(dimethylurea), 4,4'-methylenebis(phenyldimethylurea), or 3-phenyl-1,1-dimethylurea may be used. As commercially available products of the urea compound, there are given, for example, DCMU99 (manufactured by Hodogaya Chemical Co., Ltd.), and Omicure 24, Omicure 52, and Omicure 94 (each of which is manufactured by Emerald performance, LLC).

The blending amount of the component (E) is preferably from 1 part by mass to 7 parts by mass, more preferably from 3 parts by mass to 5 parts by mass with respect to 100 parts by mass of all the epoxy resin components. When the blending amount is less than 1 part by mass, a reaction between the epoxy resins and the curing agent does not sufficiently advance, and hence the elastic modulus and heat resistance of the cured product reduce in some cases. In addition, when the blending amount is more than 7 parts by mass, the reaction between the epoxy resins and the curing agent is inhibited by the self-polymerization reactions of the epoxy resins, and hence the toughness of the cured product reduces or the elastic modulus thereof reduces in some cases.

The epoxy resin composition of the present invention may include, as optional components, a thermoplastic resin, a thermoplastic elastomer, an elastomer, and various additives, such as a defoaming agent and a leveling agent (component (F)).

When, for example, a thermoplastic resin, a thermoplastic elastomer, or an elastomer is incorporated as the component (F), the component not only serves to change the viscoelasticity of the epoxy resin composition of the present invention to optimize the viscosity, storage modulus, and thixotropic property thereof but also improves the fracture toughness of the cured product of the epoxy resin composition. The thermoplastic resin, the thermoplastic elastomer, and the elastomer may be used alone or in combination thereof. Any such additive may be blended in an amount of from 1 part by mass to 15 parts by mass, preferably from 1 part by mass to 10 parts by mass with respect to 100 parts by mass of the entirety of the resin composition.

The thermoplastic resin or the like may be dissolved in the epoxy resin component, or may be incorporated into the epoxy resin composition in the form of fine particles, long fibers, short fibers, woven fabric, non-woven fabric, a mesh, or pulp.

As the thermoplastic resin, a thermoplastic resin having, in its main chain, at least one bond selected from the group consisting of a carbon-carbon bond, an amide bond, an imide bond, an ester bond, an ether bond, a carbonate bond, a urethane bond, a urea bond, a thioether bond, a sulfone bond, an imidazole bond, and a carbonyl bond is preferably used. Specific examples thereof include thermoplastic resins belonging to engineering plastics, such as polyacrylate, polyamide, polyaramid, polyester, polycarbonate, polyphenylene sulfide, polybenzimidazole, polyimide, polyetherimide, polysulfone, and polyethersulfone.

Of those, polyimide, polyetherimide, polysulfone, polyether sulfone, and the like are particularly preferably used because of being excellent in heat resistance. In addition, any such thermoplastic resin preferably has a functional group having reactivity with the epoxy resins from the viewpoints of an improvement in fracture toughness of the cured product of the epoxy resin composition of the present invention and the maintenance of the environmental resistance thereof. Examples of a functional group having preferred reactivity with the epoxy resins include a carboxyl group, an amino group, and a hydroxy group.

A defoaming agent or a leveling agent may be added as the component (F) for the purpose of improving the surface smoothness of the cured product. Any such additive may be blended in an amount of from 0.01 part by mass to 3 parts by mass, preferably from 0.01 part by mass to 1 part by mass with respect to 100 parts by mass of the entirety of the resin composition. A blending amount of less than 0.01 part by mass is not preferred because a smoothening effect on the surface of the cured product does not appear, and a blending amount of more than 3 parts by mass is not preferred because the additive bleeds out to the surface to be conversely responsible for the impairment of its smoothness. In addition, a pigment and other additives may be blended as required.

However, the blending amount of the components (A) to (D) is desirably set to 50 mass % or more, preferably 80 mass % or more of the entirety of the epoxy resin composition of the present invention so that the entirety of the composition may be kept liquid. A solvent is not treated as an additive.

A method of producing the epoxy resin composition of the present invention is not particularly limited, and the composition only needs to be produced by a known method. For example, all the components forming the epoxy resin composition may be simultaneously mixed with each other, or the composition may be prepared by using a master batch, which is prepared by mixing part of the epoxy resins to be incorporated into the composition and the component (D) (curing agent) or the like in advance. A mixer, such as a triple roll mill, a planetary mixer, a kneader, a universal stirring machine, a homogenizer, or a homodispenser, may be used in a mixing operation.

The epoxy resin composition may be produced through, for example, the following steps:

Step (1): a step of uniformly dispersing the component (D) in part of the epoxy resins to prepare a resin composition;

Step (2): a step of loading the epoxy resins (the component (A) and the component (B), or when the epoxy resin (Z) or the like is incorporated, all of the components (A), (B), and (Z)), the component (C), and the additive or the like into a dissolution vessel, followed by the mixing of the components under heating at from 140° C. to 170° C. for from 1 hr to 6 hr to provide a diblock copolymer dissolution-based master batch; and Step (3): a step of cooling the master batch obtained in the step (2) to from 50° C. to 70° C., followed by the addition of the resin composition obtained in the step (1) to the master batch and the mixing of the materials at from 50° C. to 70° C. for from 0.5 hr to 2 hr to provide the epoxy resin composition.

The following step (3') may be arranged between the step (2) and the step (3). In that case, part of the epoxy resins are loaded in the step (2), and the remainder thereof are loaded in the step (3).

Step (3'): A step of loading a thermoplastic resin dissolution base and the remainder of the components (A), (B), (C), and (Z) into the dissolution vessel, followed by the mixing of the components under heating at from 70° C. to 140° C. for from 1 hr to 3 hr to provide a master batch.

A film of the epoxy resin composition of the present invention may be obtained by applying a solution of the epoxy resin composition to release paper or the like. The film of the present invention is useful as a surface protective film or an adhesive film by being bonded to a substrate.

In addition, a use method of the epoxy resin composition of the present invention is preferably as follows: the epoxy resin composition of the present invention is applied to the surface of a substrate, such as release paper. The resultant applied layer may be bonded to another substrate under an uncured state and then cured, or the applied layer itself may be cured and used as a film.

EXAMPLES

The present invention is described below by way of Examples, but the present invention is by no means limited to these Examples. The contents of the components (A) to (F) in Table 1 are each represented in the unit of part(s) by mass.

<Raw Materials>

Bifunctional epoxy resin having an oxazolidone ring (product name: YD-952, manufactured by Nippon Steel & Sumikin Chemical Co., Ltd.)

Bisphenol A-type bifunctional epoxy resin (product name: YD-128, manufactured by Nippon Steel & Sumikin Chemical Co., Ltd., viscosity (25° C.): 13,000 mPa·s, liquid at normal temperature)

Bisphenol A-type bifunctional solid epoxy resin (product name: YD-011, manufactured by Nippon Steel & Sumikin Chemical Co., Ltd., solid at normal temperature)

Phenol novolac-type bifunctional epoxy resin (product name: KDPN-1020, manufactured by Nippon Steel & Sumikin Chemical Co., Ltd., liquid at normal temperature)

Acrylic block copolymer (diblock copolymer of poly(methyl methacrylate) and poly(butyl acrylate)) (product name: Nanostrength D51N, manufactured by ARKEMA)

Acrylic block copolymer (triblock copolymer of poly(methyl methacrylate), poly(butyl acrylate), and poly(methyl methacrylate) further copolymerized with dimethylacrylamide) (product name: Nanostrength M52N, manufactured by ARKEMA)

Dicyandiamide (product name: DICY15, manufactured by Mitsubishi Chemical Corporation)

3-(3,4-Dichlorophenyl)-1,1-dimethylurea (product name: DCMU99, manufactured by Hodogaya Chemical Co., Ltd.)

Examples 1 to 3 and Comparative Examples 1 to 6

Part of a component (B-1) (product name: YD-128) was portioned out of the composition of each of epoxy resin compositions of Examples and Comparative Examples shown in Table 1, and a component (D-1) (product name: DICY15) and a component (E-1) (product name: DCMU99) were uniformly dispersed therein with a triple roll mill to prepare a resin composition 1.

All the components except those used in the preparation of the resin composition out of the respective components shown in Table 1 were weighed in a glass flask, and were mixed under heating at 150° C. to provide a uniform master batch. Next, the resultant master batch was cooled to 60° C. or less. After that, the resin composition 1 was weighed and added to the master batch, and the materials were mixed under heating at from 60° C. to 70° C. so that the resin composition was uniformly dispersed in the master batch. Thus, an epoxy resin composition was obtained. The composition of each epoxy resin composition thus obtained is as shown in Table 1.

The resultant epoxy resin composition was sandwiched between metal plates together with a polytetrafluoroethylene-made spacer having a thickness of 1 mm, and the resultant was press-held at 150° C. and 1 MPa for 60 min to be cured. Thus, a cured resin plate for DMA measurement was obtained.

In addition, the resultant epoxy resin composition was poured into a mold measuring 4 mm thick by 10 mm wide by 150 mm long while being heated at from 60° C. to 80° C., and was subjected to vacuum defoaming. After that, the composition was cured at 150° C. for 60 min to provide a cured resin plate for a bending test.

<Method of Measuring Tan δ>

The cured resin test plate for DMA measurement was processed into a test piece (measuring 60 mm long by 5 mm wide), and its dynamic viscoelasticity was measured with a dynamic viscoelasticity-measuring apparatus (RSA3 manufactured by TA Instruments) at a tensile displacement of 0.1% and a frequency of 1 Hz in the range of from 0° C. to 250° C. The average of the resultant tan δ values in the range of from 0° C. to 10° C. was used as a tan δ (from 0° C. to 10° C.). In addition, the resultant tan δ was used as a loss factor at each temperature, and the temperature at which the tan δ showed the maximum value was adopted as a Tg (glass transition temperature).

<Methods of Measuring Bending Characteristics of Cured Resin Plate>

The bending characteristics of the cured resin plate for a bending test were measured with a universal tester including a 1,000-newton load cell (manufactured by Shimadzu Corporation, product name: AGS-X). The bending strength, bending moduli (storage modulus: E', loss modulus: E"), and bending strain of the test piece were measured under an environment having a temperature of 23° C. and a humidity of 50% RH with a three-point bending jig in conformity with JIS K 7074.

Those results are shown in Table 1 and FIG. 1 to FIG. 5.

TABLE 1

|  | Example 1 | Example 2 | Example 3 | Comparative Example 1 | Comparative Example 2 | Comparative Example 3 | Comparative Example 4 | Comparative Example 5 | Comparative Example 6 |
| --- | --- | --- | --- | --- | --- | --- | --- | --- | --- |
| YD-952 | 15 | 15 | 15 | 15 | 15 | 15 | 15 |  |  |
| YD-128 | 45 | 45 | 45 | 45 | 45 | 45 | 45 | 41 | 45 |
| KDPN-1020 | 40 | 40 | 40 | 40 | 40 | 40 | 40 | 59 | 40 |

TABLE 1-continued

|  | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|
| D-51N | 17 | 15 | 12 | 8 | 10 | 20 |  |  | 17 |
| M-52N |  |  |  |  |  |  | 15.3 | 15.3 |  |
| YD-011 |  |  |  |  |  |  |  |  | 15 |
| DICY | 5.5 | 5.5 | 5.5 | 5.5 | 5.5 | 5.5 | 4.9 | 5.3 | 4.8 |
| DCMU99 | 4.7 | 4.7 | 4.7 | 4.7 | 4.7 | 4.7 | 3.7 | 4.0 | 3.6 |
| tanδ (from 0° C. to 10° C.) | 0.043 | 0.035 | 0.033 | 0.025 | 0.03 | 0.067 | 0.031 | 0.032 | 0.030 |
| Bending strength (MPa) | 55 | 60 | 65 | 80 | 75 | 45 | 55 | 55 | 60 |
| Bending strain (%) | 5 | 5.5 | 5.5 | 4.5 | 4.5 | 3 | 5 | 5 | 5 |

Figure 2:
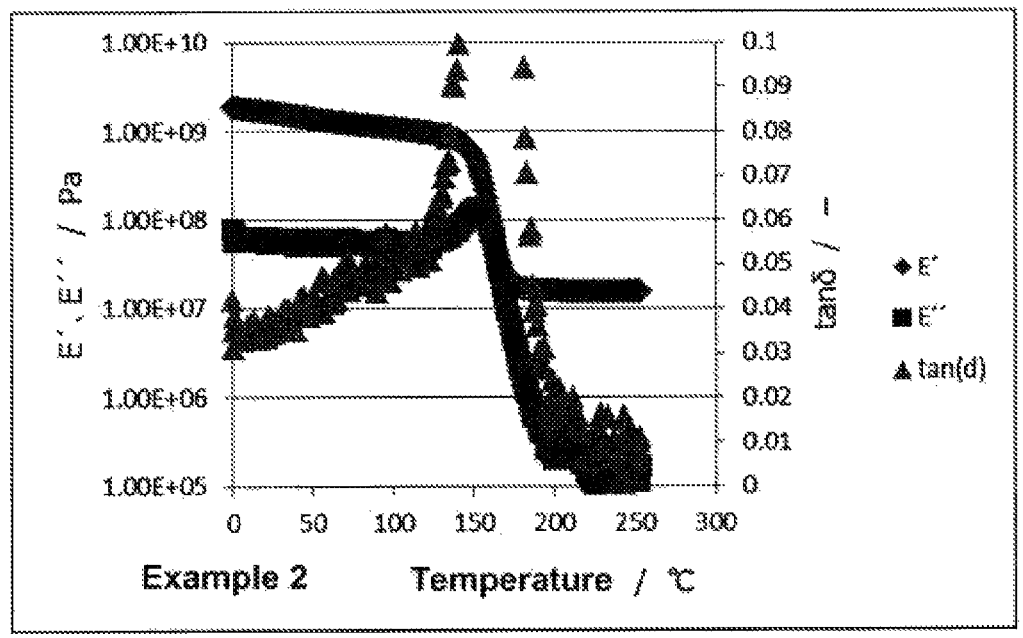
FIG. 2 is a DMA chart of a cured product of Example 2.
Figure 3:
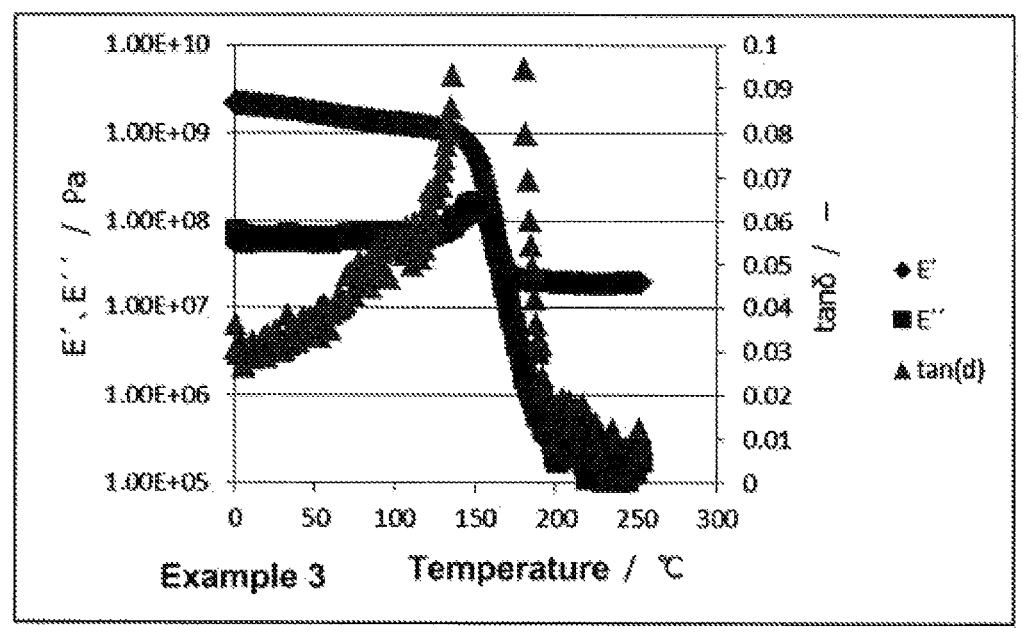
FIG. 3 is a DMA chart of a cured product of Example 3.
Figure 4:
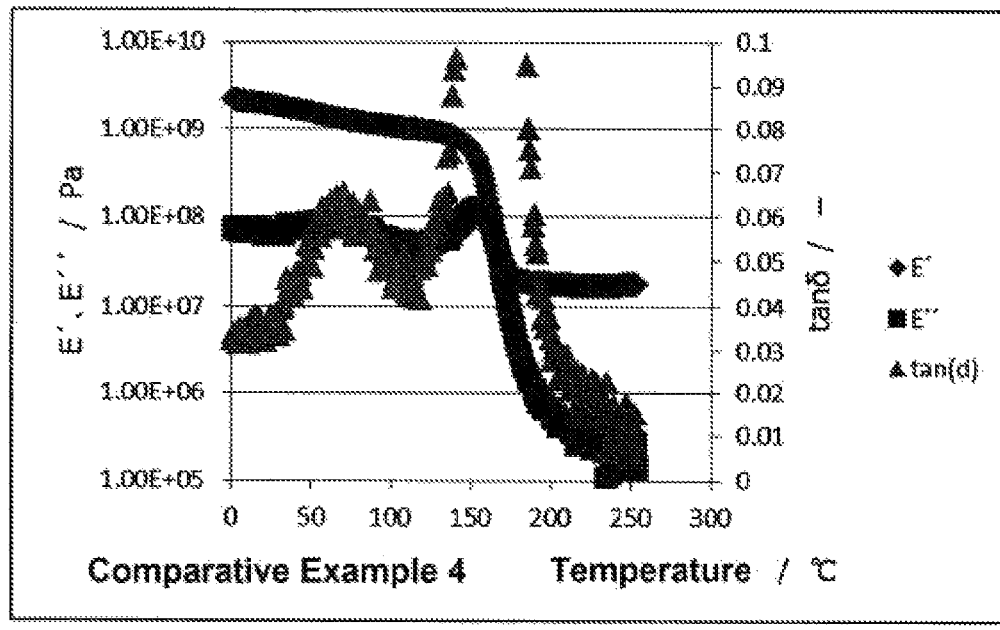
FIG. 4 is a DMA chart of a cured product of Comparative Example 4.
Figure 5:
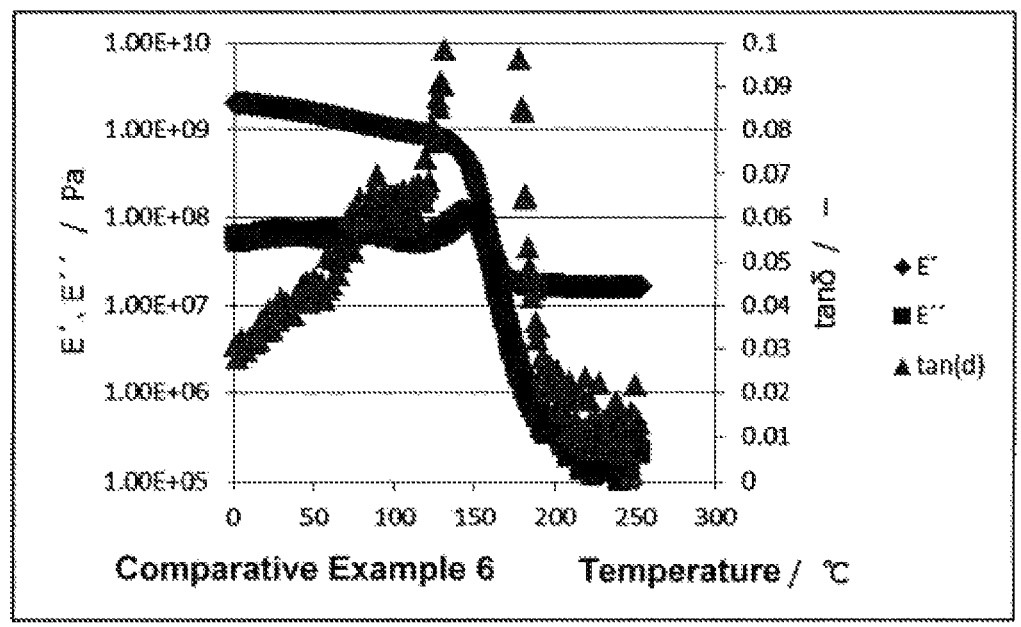
FIG. 5 is a DMA chart of a cured product of Comparative Example 6.

As shown in Table 1 and FIG. 1 to FIG. 3, in each of Examples 1 to 3, the tan δ in the temperature region of 0° C. or more is higher than 0.033. In addition, reductions in mechanical properties are suppressed, and a Tg of 120° C. or more is achieved. In addition, it is found that in each of Comparative Examples, as shown in FIG. 4 or FIG. 5, the tan δ in the room temperature region (from 0° C. to 30° C.) reduces.

INDUSTRIAL APPLICABILITY

The molded product obtained by heating and curing the epoxy resin composition of the present invention can obtain a high tan δ in the temperature region of 0° C. or more, and hence can obtain an excellent damping property and an excellent attenuation property while having high heat resistance and high mechanical properties.

Accordingly, according to the present invention, there can be provided a wide variety of adhesives and fiber-reinforced plastic molded bodies each of which has high heat resistance, and is excellent in damping property and attenuation property, such as an adhesive intended for a steel plate for a washing machine, an industrial damping material, and molded bodies in an aircraft application, and sports and leisure applications.

The invention claimed is:

1. An epoxy resin composition, consisting essentially of the following components A to E:
   component A: an epoxy resin having an oxazolidone ring structure in a molecule thereof;
   component B: two or more kinds of epoxy resins selected from a bisphenol-type epoxy resin, a biphenyl-type epoxy resin, a cyclopentadiene-type epoxy resin, and a phenol novolac-type epoxy resin, the epoxy resins being liquid at 30° C.;
   component C: a diblock copolymer having a B-M structure
where M represents a block formed of a homopolymer of methyl methacrylate or a copolymer containing at least 50 wt % of methyl methacrylate, B represents a block that is incompatible with the epoxy resins and the block M, and that has a glass transition temperature Tg of 20° C. or less, and respective blocks represented by B and M are directly bonded to each other or are linked to each other through a linking group; and
   component D: an amine-based curing agent that is dicyandiamide or a derivative thereof,
   component E: a curing accelerator,
   wherein blending ratios of the respective components satisfy the following equations:

$$A/(A+B)=0.05 \text{ to } 0.25; \text{ and}$$

$$C/(A+B)=0.12 \text{ to } 0.19$$

where A to C represent contents (masses) of the components A to C, respectively, and the component D is blended in such an amount that a ratio of a number of moles of active hydrogen of the component D to a total number of moles of epoxy groups of the epoxy resins is from 0.6 to 1.0, and where a cured product of the epoxy resin composition has a tanδ of 0.033 or more in a temperature region of from 0° C. to 10° C., and having a Tg of 120° C. or more and 160° C. or less.

2. The epoxy resin composition according to claim 1, wherein the block M of the component C is a structural unit formed of a homopolymer of methyl methacrylate, and the block B thereof is a structural unit selected from 1,4-polybutadiene, polybutyl acrylate, and poly(2-ethylhexyl acrylate).

3. A cured product of the epoxy resin composition of claim 1.

4. A cured product of the epoxy resin composition of claim 2.

5. The epoxy resin composition according to claim 1, wherein C/(A+B)=0.13 to 0.17.

6. A cured product of the epoxy resin composition of claim 5.

* * * * *